US007558895B2

United States Patent
Bruce

(10) Patent No.: US 7,558,895 B2
(45) Date of Patent: Jul. 7, 2009

(54) INTERCONNECT LOGIC FOR A DATA PROCESSING APPARATUS

(75) Inventor: Alistair Crone Bruce, Stockport (GB)

(73) Assignee: ARM Limited, Cambridge (GB)

( * ) Notice: Subject to any disclaimer, the term of this patent is extended or adjusted under 35 U.S.C. 154(b) by 162 days.

(21) Appl. No.: 11/882,064

(22) Filed: Jul. 30, 2007

(65) Prior Publication Data
US 2008/0040523 A1    Feb. 14, 2008

(30) Foreign Application Priority Data
Aug. 8, 2006    (GB)    ................................. 0615734.1

(51) Int. Cl.
*G06F 13/00* (2006.01)
(52) U.S. Cl. .................... 710/110; 710/112; 710/310
(58) Field of Classification Search ......... 710/110–119, 710/306–317, 29, 36–43
See application file for complete search history.

(56) References Cited

U.S. PATENT DOCUMENTS

| | | | | |
|---|---|---|---|---|
| 5,682,485 | A * | 10/1997 | Farmer et al. ............... | 710/316 |
| 7,181,556 | B2 | 2/2007 | Gwilt | |
| 7,219,178 | B2 | 5/2007 | Harris et al. | |
| 2003/0120874 | A1* | 6/2003 | Deshpande et al. ......... | 711/141 |
| 2006/0061689 | A1* | 3/2006 | Chen et al. .................. | 348/607 |

* cited by examiner

Primary Examiner—Raymond N Phan
(74) Attorney, Agent, or Firm—Nixon & Vanderhye P.C.

(57) ABSTRACT

An interconnect logic and method are provided for controlling transaction reordering by slave logic units coupled to the interconnect logic. The interconnect logic couples master logic units and slave logic units to enable transactions to be performed, each transaction having a transaction identifier associated therewith. ID aliasing logic is associated with at least a subset of slave logic units, with each slave logic unit in that at least a subset being able to issue response transfers for different transactions out of order with respect to the order of receipt by that slave logic unit of the address transfers of those transactions. For at least a subset of the transactions, if the slave logic unit involved in that transaction is associated with the ID aliasing logic, the ID aliasing logic is operable to replace the transaction identifier for that transaction with a predetermined identifier and then to forward the address transfer of the transaction along with that predetermined identifier to the slave logic unit. For any transactions that have their transaction identifier replaced with the predetermined identifier, the slave logic unit will not then perform any reordering since the same identifier, namely the predetermined identifier, is associated with each of those transactions. For any response transfer issue by the slave logic unit with the predetermined identifier, the ID aliasing logic replaces that predetermined identifier with the original transaction identifier removed previously so as to enable the routing of that data transfer via the interconnect logic to the appropriate master logic unit. This provides a very simple and effective mechanism for reducing the occurrence of a deadlock within the interconnect logic.

18 Claims, 2 Drawing Sheets

INTERCONNECT LOGIC FOR A DATA PROCESSING APPARATUS

BACKGROUND OF THE INVENTION

1. Field of the Invention

The present invention relates to interconnect logic for a data processing apparatus, and in particular to techniques for controlling reordering of transactions between master logic units and slave logic units coupled to the interconnect logic.

2. Description of the Prior Art

Within a data processing apparatus having a plurality of master logic units and slave logic units, it is known to provide interconnect logic for coupling the master logic units and the slave logic units to enable transactions to be performed. Each transaction consists of an address transfer from a master logic unit to a slave logic unit, and one or more data transfers between that master logic unit and that slave logic unit. For a write transaction these data transfers will pass from the master logic unit to the slave logic unit (in some implementations there will additionally be a write response transfer from the slave logic unit to the master logic unit), whilst for a read transaction these data transfers will pass from the slave logic unit to the master logic unit. Any transfers from a slave logic unit to a master logic unit are referred to herein as response transfers.

The interconnect logic will provide a plurality of connection paths for coupling the various master logic units and slave logic units. The way in which the various transfers are routed via those connection paths will be dependent on the bus protocol employed within the interconnect logic. One known type of bus protocol is the non-split transaction protocol, such as is employed within a data processing apparatus having an AHB bus designed in accordance with the AHB bus protocol developed by ARM Limited, Cambridge, United Kingdom. In accordance with such a non-split transaction protocol, there is a fixed timing relationship between the address transfer of a transaction and the subsequent one or more data transfers of that transaction. In particular, the data transfer starts in the cycle following that in which the address is transferred. Due to the fixed timing relationship between the address transfers and data transfers, then it will be appreciated that the data transfers of multiple transactions occur in the same order as the address transfers.

As interconnect logic increases in complexity, due to the need to support the interconnection of a larger number of master and slave logic units, then another type of bus protocol has been developed known as a split transaction protocol. In accordance with such a split transaction protocol, the plurality of connection paths within the interconnect logic provide at least one address channel for carrying address transfers and at least one data channel for carrying data transfers. An example of such a split transaction protocol is the AXI (Advanced eXtensible Interface) protocol developed by ARM Limited, Cambridge, United Kingdom. The AXI protocol provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to the master logic unit at the end of a write transaction, such transaction status information indicating for example whether the transaction completed successfully, or whether an error occurred, etc. Use of such a split transaction protocol can increase the performance of a system compared with a similar system using a non-split transaction protocol.

Conventionally, when adopting such a split transaction protocol, data transfers over a data channel are prioritised according to the temporal ordering of the corresponding address transfers over the relevant address channel, such that data pertaining to earlier addresses (i.e. addresses transferred earlier over the address channel) are given priority over data pertaining to later addresses.

An enhancement that may be used to allow some local re-ordering of transactions at a particular slave logic unit when using interconnect logic conforming to such a split transaction protocol is described in U.S. patent application Ser. No. 10/743,537 filed on 23 Dec. 2003, for which ARM Limited is the assignee, the entire contents of which are herein incorporated by reference. In accordance with the teaching of this patent application, each address transfer includes a source identifier identifying the source of the transaction. Preferably, each master logic unit has a plurality of possible source identifiers that can be associated with transactions that it issues. This has the advantage that, for example, transactions generated by different applications running on the same processor can be distinguished so that transaction sequences from each application can be independently ordered in cases where the processes themselves are independent of each other. A slave device can then perform some local reordering of pending transactions it has to service based on such source identifier information, such that, for example, the one or more data transfers associated with a transaction issued with a particular source identifier can be given priority over the one or more data transfers associated with an earlier pending transaction issued with a different, lower priority, source identifier.

Hence, whilst for any particular transaction, the slave device is required to issue any response transfers in order, if the slave device has two pending transactions which have different transaction identifiers, it can choose which transaction to process first. Whilst this enables different priorities to be given to different master logic units, or even to particular applications running on a particular master logic unit, it can give rise to a potential cyclic dependency deadlock occurring within the interconnect logic. In particular, if at least some master logic units can issue multiple pending transactions to more than one slave device, then situations can arise where a transaction with a particular transaction identifier is issued to one slave device (which for clarity we will call slave 1), whilst another transaction with the same transaction identifier is then issued to another slave device (which for clarity we will call slave 2). The bus protocol will typically require that for transactions having the same transaction identifier, the transactions must be processed in order. However, individual slave logic units do not communicate with each other, and if those slave logic units individually have the ability to reorder transactions that have different transaction identifiers, it is possible that slave 2 that received the later transaction with the same transaction identifier issues a response transfer prior to slave 1 that received the earlier transaction with that transaction identifier. At this point, slave 2 cannot take any further action until that response transfer is accepted by the interconnect logic for routing to the master logic unit associated with the transaction, but the interconnect logic cannot accept that response transfer, because first it needs to receive the response transfer or response transfers associated with the earlier transaction issued with the same transaction identifier to slave 1. This causes slave 2 to become blocked, since it cannot de-assert the response and cannot continue processing until the response is accepted by the interconnect logic.

This may in itself be sufficient to cause deadlock, if for example slave 1 is currently blocked trying to output a response for a transaction which is later than a transaction with the same transaction identifier already issued to slave 2 but demoted by slave 2 due to reordering. This scenario is illustrated by the following example sequence of four transactions, where the two transactions issued by master 1 have the same transaction identifier and similarly the two transactions issued by master 2 have the same transaction identifier:

M1 -> S2
M1 -> S1
M2 -> S1
M2 -> S2

This causes the transactions to be sequenced with the two slaves as follows:

S1: M1.2 M2.1
S2: M1.1 M2.2

In the above, the suffix ".1" means first transaction from the associated master, and ".2" means second transaction from the associated master, such that for example "M1.1" means the first transaction from master 1. If slave 2 reorders its two transactions, then it can be seen that both slave 1 and slave 2 are trying to issues a response transfer in connection with the second transaction from a master, both of which are blocked since the masters will need to receive the response transfer(s) associated with their first transactions first.

The possibilities for deadlock become even more likely when multiple of the slave devices have the capability to reorder.

When deadlock occurs, it is often very difficult to restore the interconnect logic to a normal operating state. Therefore, when deadlock occurs it is generally required that the configuration of the interconnect be reset, which will also typically impact the operation of logic units coupled thereto. Hence, these logic units may also need to be reset to enable the required data transfers to be performed or completed. Accordingly, it will be appreciated that deadlock can have a devastating impact on the performance of a data processing apparatus.

A number of deadlock avoidance schemes have been developed which seek to reduce or remove the likelihood of a deadlock occurring. One such scheme is referred to as a "single slave" scheme, which is a scheme adopted at each master logic unit. In accordance with this scheme, a master logic unit can issue as many pending transactions as it desires to an individual slave logic unit, and these transactions can have the same or different transaction identifiers. However, for any particular transaction identifier, the master logic unit is only allowed to have transactions with that transaction identifier pending with one slave logic unit at a time. Only when those transaction have been completed can the transaction identifier be reused in connection with transactions issued to a different slave device. Accordingly, by this approach, the situation is avoided where two transactions having the same transaction identifier are issued to multiple slave devices at the same time.

In accordance with an alternative scheme, referred to as a "unique ID" scheme, each master logic unit is constrained to always use different identifiers for transactions issued to different slave logic units, again this preventing this situation where multiple transactions with the same identifier are pending with different slave logic units.

In accordance with a third type of scheme, referred to as a "cyclic order" scheme, an arbitrary order is assigned to the plurality of slave logic units coupled to the interconnect logic. Each master logic unit is then constrained to send transactions to the various slave logic units in that predefined arbitrary order. Hence, by way of example, if the predefined order was slave zero, slave two, slave one, then each master logic unit can issue an arbitrary number of transactions to slave zero, followed by an arbitrary number of transactions to slave two, followed by an arbitrary number of transactions to slave one. Thereafter, all pending transactions have to be completed before that master logic unit can then again start sending transactions to slave zero.

Whilst all of these techniques are effective at reducing or removing the risk of deadlock occurring, they all place significant constraints on how each master logic unit can behave.

U.S. patent application Ser. No. 10/953,500 filed on 30 Sep. 2004, for which ARM Limited is the assignee, the entire contents of which are herein incorporated by reference, describes providing the interconnect logic with deadlock prediction logic which, at the time each address transfer is issued by a master logic unit, seeks to determine whether propagation of that address transfer may cause the interconnect logic to become deadlocked, and if so to prevent the propagation of that address transfer. The prediction logic can take regard of deadlock avoidance schemes such as those mentioned earlier when deciding whether any particular address transfer is safe or instead may cause deadlock problems. Again, this scheme restricts the flexibility of the master logic units when issuing transactions, since certain address transfers will be prevented from being propagated if the prediction logic predicts that a deadlock may arise. Further, such a scheme is relatively complex in that it requires the provision of such prediction logic.

As an alternative to the above types of schemes, another possibility that may be used in accordance with some bus protocols is to make use of a timeout mechanism to recover from deadlock situations after they occur. However, as will be appreciated from the earlier discussion of deadlocks, such deadlocks can significantly impact the performance of the data processing apparatus, and the steps required to recover from a deadlock are significant. Accordingly, it is generally felt desirable to provide schemes for seeking to avoid deadlocks occurring, rather than rely on mechanisms to recover from deadlocks after they have occurred.

Accordingly, it would be desirable to provide an improved technique for controlling the above described cyclic dependency deadlock problem, which does not require constraining the way in which individual master logic units issue transactions.

SUMMARY OF THE INVENTION

Viewed from a first aspect, the present invention provides interconnect logic for coupling master logic units and slave logic units within a data processing apparatus to enable transactions to be performed, each transaction comprising an address transfer from a master logic unit to a slave logic unit and one or more data transfers between that master logic unit and that slave logic unit, at least one data transfer being a response transfer from the slave logic unit to the master logic unit, each transaction having a transaction identifier associated therewith, the interconnect logic comprising: a plurality of connection paths operable to provide at least one address channel for carrying address transfers, and at least one data channel for carrying data transfers; and ID aliasing logic associated with at least a subset of said slave logic units, each slave logic unit in said at least a subset being able to issue response transfers for different transactions out of order with respect to the order of receipt by that slave logic unit of the address transfers of those transactions; for at least a subset of transactions, if the slave logic unit involved in that transaction is associated with the ID aliasing logic, the ID aliasing logic being operable: (a) to replace the transaction identifier for that transaction with a predetermined identifier and then to forward the address transfer of that transaction along with the predetermined identifier to the slave logic unit; (b) for any response transfer issued by the slave logic unit with the predetermined identifier, to replace the predetermined identifier with the transaction identifier removed at said step (a) to enable the routing of that response transfer over the connection paths of the interconnect logic to the master logic unit associated with that transaction.

In accordance with the present invention, ID aliasing logic is provided in association with at least a subset of the slave logic units, where each of the slave logic units with which the aliasing logic is associated are able to issue response transfers for different transactions out of order with respect to the order of receipt by that slave logic unit of the address transfers of those transactions. For at least some transactions, if the slave logic unit involved in that transaction is associated with the ID aliasing logic, the ID aliasing logic is arranged to replace the transaction identifier of that transaction with a predetermined identifier, which is then routed to the slave logic unit with the address transfer. As a result, for any transactions that have their transaction identifiers aliased in this manner, the slave logic unit will not reorder between those different transactions as it can only reorder between transactions having different transaction identifiers, and each of these transactions will have the same transaction identifier, namely the predetermined identifier that has been inserted by the ID aliasing logic.

When subsequently a response transfer is issued by the slave logic unit with the predetermined identifier, then the ID aliasing logic replaces that predetermined identifier with the transaction identifier that it had earlier removed so as to enable the routing of that data transfer via the interconnect logic to the appropriate master logic unit.

Through use of the ID aliasing logic of the present invention, ordering can be imposed on particular transactions by using the facilities of the existing protocol (namely that slave logic units cannot reorder between transactions having the same transaction identifier), rather than imposing extra mechanisms on top of the existing protocol. Accordingly, the present invention provides a technique for controlling cyclic dependency deadlock issues inherent in split transaction protocol systems by using the very rules that created the problem in the first place, namely the ability for slave logic units to reorder between transactions having different transaction identifiers.

Accordingly, the present invention provides a very simple and effective technique for combating such cyclic dependency deadlock problems within the interconnect logic.

The transactions may take a variety of forms. In one embodiment, if the transaction is a read transaction, the slave logic unit associated with the transaction is operable to issue one or more response transfers containing the data the subject of the read transaction. Alternatively, if the transaction is a write transaction, the slave logic unit associated with the transaction is operable to issue a response transfer containing transaction status information at the end of a write transaction.

The ID aliasing logic can be arranged in a variety of ways. However, in one embodiment, not all transactions issued to a slave logic unit associated with the ID aliasing logic have their transaction identifier replaced with the predetermined identifier, and instead, for each slave logic unit associated with the ID aliasing logic, the ID aliasing logic comprises ID matching logic for determining for each transaction involving that slave logic unit whether the associated transaction identifier matches a stored list of transaction identifiers, and if so to replace the transaction identifier with the predetermined identifier. By such an approach, the aliasing of transaction identifiers with the predetermined identifier can be restricted to a certain subset of transaction identifiers, for example those transaction identifiers issued by master logic units that wish to post addresses to multiple slave devices. For that particular example, it would also be possible to restrict the aliasing to the particular transaction identifiers that are used to access the multiple slave devices. This leaves other transaction identifiers not in the stored list free to participate in interleaving and allows the slave logic units some discretion in their scheduling of transactions.

In one embodiment, for each slave logic unit the ID aliasing logic further comprises: a FIFO (First-In-First-Out) storage into which any transaction identifier replaced by the predetermined identifier is placed; and second matching logic operable for each data transfer issued by the slave logic unit to detect whether the predetermined identifier is issued in association with that data transfer and if so to replace the predetermined identifier with the transaction identifier obtained from the FIFO storage. This provides an effective mechanism for replacing the predetermined identifier with the appropriate transaction identifier as each response transfer is routed back to the appropriate master logic unit.

Since for certain transactions there will be multiple response transfers, it is necessary to keep any transaction identifier in the FIFO storage until such time that the final response transfer for the associated transaction has been issued. In accordance with one embodiment, for each slave logic unit the ID aliasing logic is operable for each transaction involving that slave logic unit to detect a final response transfer issued by that slave logic unit for that transaction, and upon such detection to pop from the FIFO storage the transaction identifier at a head of the FIFO storage. Accordingly, by this approach, the transaction identifier at the head of the FIFO will stay at the head of the FIFO until the final response transfer of that transaction has been issued, whereafter it will be popped from the FIFO storage to enable the next transaction identifier to proceed to the head of the FIFO storage.

As discussed earlier, for any transaction identifiers not in the stored list, those transaction identifiers can participate in interleaving and can be reordered by the slave logic unit. In one embodiment, for any transaction identifiers not in said stored list, those transactions identifiers are useable by master logic units when implementing one or more further deadlock avoidance schemes not utilising the ID aliasing logic. For example, those transaction identifiers may be associated with the earlier-mentioned prior art schemes that place constraints on the way in which individual master logic units can issue address transfers of transactions. Hence, the scheme of embodiments of the present invention is very flexible, since it can be used in isolation, or in combination with one or more further deadlock avoidance schemes.

In one embodiment, said at least a subset of transactions comprises all transactions for which the slave logic unit involved is associated with the ID aliasing logic. Hence, in this simplified embodiment, the ID aliasing logic is arranged to replace all transaction identifiers with the predetermined identifier, such that the recipient slave logic unit cannot reorder any of its transactions, and merely processes them all in order.

In such embodiments, for each slave logic unit the ID aliasing logic may further comprise: a FIFO storage into which each transaction identifier replaced by the predetermined identifier is placed; and logic operable for each data transfer issued by the slave logic unit to replace the predetermined identifier with the transaction identifier obtained from the FIFO storage. Again, as with the previously described embodiment, the ID aliasing logic can be rearranged to detect a final response transfer issued by the slave logic unit for a particular transaction and upon that detection to pop from the FIFO storage the transaction identifier at the head of the FIFO storage.

The ID aliasing logic can be arranged in a variety of ways. However, in one embodiment, the ID aliasing logic comprises a separate logic unit for each slave logic unit in said at least a subset of said slave logic units. This hence enables the ID aliasing logic to be provided close to the interface between the interconnect logic and the coupled slave logic units, by the provision of a separate ID aliasing logic unit in association with each required slave logic unit.

Whilst the ID aliasing logic can be associated with a subset of the slave logic units, in one embodiment all of the slave logic units connected to the interconnect logic are associated with the ID aliasing logic.

The transaction identifiers as received by the ID aliasing logic can take a variety of forms. However, in one embodiment, the interconnect logic further comprises: transaction identifier generation logic associated with each master logic unit and operable to create each transaction identifier by incorporating a master identifier with an original transaction identifier issued by the master logic unit, whereby within the interconnect logic transactions issued by different master logic units are uniquely identified. Hence, even if different master logic units use the same original transaction identifiers, the transaction identifiers routed through the interconnect logic will still be unique due to the incorporation by the transaction identifier generation logic of a master identifier with the original transaction identifier.

The slave logic units can take a variety of forms. However, in one embodiment, at least one of those slave logic units associated with the ID aliasing logic is a memory controller used to control accesses to memory. Memory controllers are a type of slave logic unit where it is generally desirable to allow those slave logic units to reorder transactions, and accordingly the use of the ID aliasing technique of embodiments of the present invention is a particularly effective scheme to use in association with a memory controller.

The address channels and data channels provided within the interconnect logic can take a variety of forms. However, in one embodiment such channels are unidirectional channels. Accordingly, there will be a separate read data channel and a separate write data channel rather than a bidirectional data channel.

Viewed from a second aspect, the present invention provides a data processing apparatus comprising a plurality of master logic units and slave logic units, and interconnect logic in accordance with the first aspect of the present invention for coupling the master logic units and the slave logic units to enable transactions to be performed.

Viewed from a third aspect, the present invention provides interconnect logic for coupling master logic means and slave logic means within a data processing apparatus to enable transactions to be performed, each transaction comprising an address transfer from a master logic means to a slave logic means and one or more data transfers between that master logic means and that slave logic means, at least one data transfer being a response transfer from the slave logic means to the master logic means, each transaction having a transaction identifier associated therewith, the interconnect logic comprising: a plurality of connection path means for providing at least one address channel means for carrying address transfers, and at least one data channel means for carrying data transfers; and ID aliasing means associated with at least a subset of said slave logic means, each slave logic means in said at least a subset being able to issue response transfers for different transactions out of order with respect to the order of receipt by that slave logic means of the address transfers of those transactions; for at least a subset of transactions, if the slave logic means involved in that transaction is associated with the ID aliasing means, the ID aliasing means being used: (a) for replacing the transaction identifier for that transaction with a predetermined identifier and then for forwarding the address transfer of that transaction along with the predetermined identifier to the slave logic means; (b) for replacing, for any response transfer issued by the slave logic means with the predetermined identifier, the predetermined identifier with the transaction identifier removed at said step (a) to enable the routing of that response transfer over the connection path means of the interconnect logic to the master logic means associated with that transaction.

Viewed from a fourth aspect, the present invention provides a method of coupling master logic units and slave logic units within a data processing apparatus to enable transactions to be performed, each transaction comprising an address transfer from a master logic unit to a slave logic unit and one or more data transfers between that master logic unit and that slave logic unit, at least one data transfer being a response transfer from the slave logic unit to the master logic unit, each transaction having a transaction identifier associated therewith, the method comprising the steps of: employing a plurality of connection paths to provide at least one address channel for carrying address transfers, and at least one data channel for carrying data transfers; for at least a subset of transactions involving a slave logic unit that is able to issue response transfers for different transactions out of order with respect to the order of receipt by that slave logic unit of the address transfers of those transactions: (a) replacing the transaction identifier for each such transaction with a predetermined identifier and then forwarding the address transfer of that transaction along with the predetermined identifier to the slave logic unit; and (b) for any response transfer issued by the slave logic unit with the predetermined identifier, replacing the predetermined identifier with the transaction identifier removed at said step (a) to enable the routing of that response transfer over the connection paths to the master logic unit associated with that transaction.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

In embodiments of the present invention, the interconnect logic of a data processing apparatus employs a split transaction protocol in which separate address channels and data channels are provided, and the timing of data transfers is decoupled with respect to the timing of address transfers of a particular transaction. In one particular embodiment, the interconnect logic operates in accordance with the AXI protocol, and the connection paths of the interconnect logic provide five channels, namely a read address channel, a write address channel, a read data channel, a write data channel and a write response channel.

Figure 1:
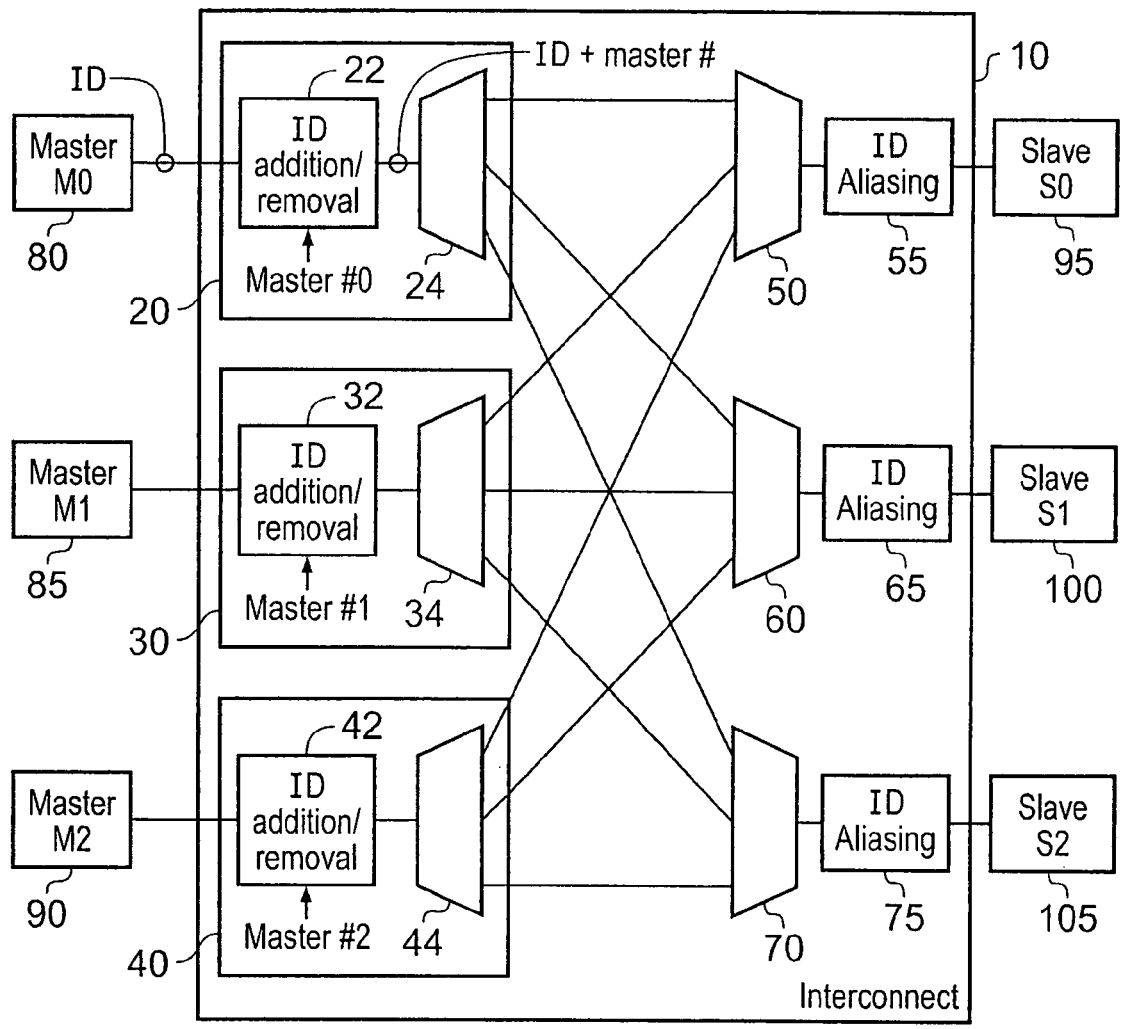
FIG. 1 is a block diagram of a data processing apparatus in accordance with one embodiment of the present invention.

FIG. 1 is a block diagram of a data processing apparatus incorporating such interconnect logic. As shown in FIG. 1, the interconnect logic has a number of master devices, in this example three master devices M0, M1, M2 80, 85, 90, connected thereto, and also has a number of slave devices, in this example slave devices S0, S1, S2 95, 100, 105, connected thereto. The interconnect logic 10 couples the master logic units and the slave logic units via a number of connection paths to enable transactions to be performed. Each transaction consists of an address transfer from a master logic unit to a slave logic unit over an address channel, and one or more data transfers between that master logic unit and that slave logic unit over an appropriate data channel. For simplicity, the individual channels are not shown separately in FIG. 1.

When each master logic unit initiates a transaction by issuing an address transfer, that master logic unit also issues a transaction identifier with the address transfer to identify the transaction, that transaction identifier then being used in association with the data transfers of the transaction, so that those data transfers can be matched up with the address transfer.

Each master logic unit 80, 85, 90 may have one or more transaction identifiers that it uses for transactions, and the transaction identifier(s) used by any particular master logic unit may or may not be different to the one or more transaction identifiers used by any other of the master logic units.

Associated with each master logic unit, the interconnect logic 10 has control and routing logic 20, 30, 40, each of which includes multiplexer/de-multiplexer logic 24, 34, 44 for routing the address transfer of a transaction over the appropriate connection paths to enable the address transfer to be routed to the appropriate slave logic unit 95, 100, 105, for routing any write data transfers to that slave logic unit, and for routing any read data transfers or write response transfers (a write response transfer containing transaction status information at the end of a write transaction, for example identifying whether the transaction completed successfully) back to the associated master logic unit from that slave logic unit.

Additionally, so that transactions from different masters can be uniquely identified within the interconnect logic 10, each control and routing logic 20, 30, 40 also includes an ID addition/removal logic unit 22, 32, 42 which is arranged for each transaction identifier issued by the associated master logic unit to extend that transaction identifier with a master number that allows the routing of responses back to that master. Similarly, when transfers are routed back to the master, the ID addition/removal logic unit 22, 32, 42 strips off the master number before the response transfer is returned to the associated master logic unit 80, 85, 90. In addition to allowing the routing of responses back to the appropriate master, the extension of the transaction identifier with a master number to create a new form of transaction identifier within the interconnect logic also has the consequence that any slave logic unit 95, 100, 105 that has the capability to reorder transactions having different transaction identifiers is then able to also reorder transactions from different masters even if they originally had the same transaction identifier.

The interconnect logic 10 also includes in association with each slave logic unit 95, 100, 105 multiplexer/de-multiplexer logic 50, 60, 70 for routing address transfers and write transfers to the associated slave logic unit, and similarly routing response transfers issued by the slave logic unit through the interconnect logic 10 towards the appropriate master logic unit.

Whilst the interconnect logic 10 of FIG. 1 is shown only having three master logic units and three slave logic units connected thereto, it will be appreciated that the number of master logic units and slave logic units connected to the interconnect can be varied, and it will also be appreciated that the connection paths provided within the interconnect logic 10 can be significantly more complex than the simple connection path network illustrated in FIG. 1.

As discussed earlier, when slave logic units connected to the interconnect logic 10 are provided with the ability to reorder pending transactions that have different transaction identifiers, this can lead to performance improvements in the processing of transactions by individual slave logic units, and can also allow certain transactions to be prioritised over other transactions. However, one potential side effect of such flexibility is that a cyclic dependency deadlock can arise within the interconnect logic 10. In order to alleviate such problems, the interconnect logic 10 of an embodiment of the present invention has an ID aliasing logic unit 55, 65, 75 associated with one or more of the slave logic units coupled to the interconnect logic 10. For the sake of illustration, in FIG. 1 each slave logic unit 95, 100, 105 is shown having an associated ID aliasing logic unit 55, 65, 75. However, if any particular slave logic unit connected to the interconnect logic 10 is not able to reorder transactions, then there will be no need for an associated ID aliasing logic unit. Similarly, if for a particular slave logic unit within the interconnect logic 10 that can re-order transactions, alternative deadlock avoidance schemes are put in place, such as the earlier described schemes that restrict the way in which individual master logic units can post addresses, then there will be no need for an associated ID aliasing logic unit. However, in one embodiment, such an ID aliasing logic unit is provided in association with any slave logic unit that is able to re-order transactions.

Each ID aliasing logic unit 55, 65, 75 is arranged for at least a subset of transactions to replace the associated transaction identifiers with a predetermined identifier and then to forward the address transfer of the transaction along with the predetermined identifier to the slave logic unit. This predetermined identifier can have any preselected value as long as it is different from any transaction identifiers received by the ID aliasing logic. This can for example be readily achieved by adding an extra bit to the ID and using the all 1s value.

Similarly, for any write data transfers of a write transaction, the ID aliasing logic unit will again replace the transaction identifier with the predetermined identifier. As a result, for any transactions which have their identifiers aliased in such a manner, the associated slave logic unit is then not able to re-order between those transactions, since as far as that slave logic unit is concerned each of those transactions has the same transaction identifier. As a result, such an approach forces that slave logic unit to process those transactions in order which removes the potential for a deadlock arising in association with those transactions.

When any response transfers are issued by the slave logic unit with the predetermined identifier, the ID aliasing logic unit 55, 65, 75 is then arranged to replace the predetermined identifier with the transaction identifier that had previously been removed in association with the relevant transaction, thereby enabling the routing of that response transfer via the interconnect logic to the master logic unit associated with that transaction.

In one embodiment, each ID aliasing logic unit 55, 65, 75 is arranged to replace every transaction identifier with the predetermined identifier. This implementation is the simplest and will prevent cyclic dependency deadlock from occurring. However, because all identifiers are in that embodiment replaced by a single identifier, interleaving of data transfers to and from multiple masters is inhibited.

In accordance with an alternative embodiment, aliasing of the transaction identifiers is restricted to a certain subset of possible transaction identifiers, for example those transaction identifiers issued by master logic units that wish to post addresses to multiple slave devices. For each such master logic unit, it may also be advantageous to restrict the aliasing to the particular identifiers that are used to access multiple slave devices. This leaves other transaction identifiers free to participate in interleaving and allows the slave logic units some discretion in their scheduling of transactions.

Figure 2:
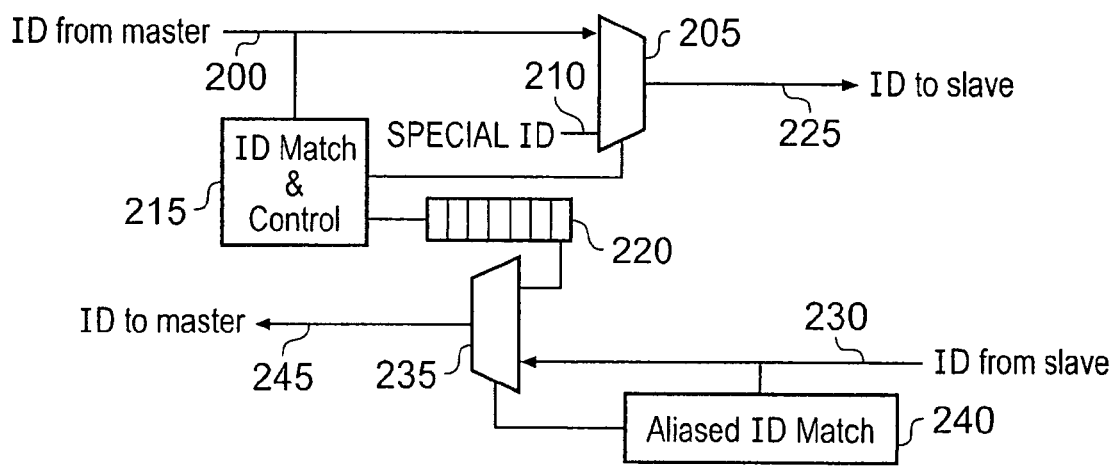
FIG. 2 is a diagram illustrating the construction of each ID aliasing unit illustrated in FIG. 1 in accordance with one embodiment of the present invention.

FIG. 2 is a block diagram illustrating the construction of each ID aliasing logic unit illustrated in FIG. 1 in accordance with such an embodiment. In FIG. 2, the path 200, 225 at the top of the figure is the path taken by any transaction identifiers issued in association with address transfers or write data transfers, whilst the path 230, 245 at the bottom of FIG. 2 is the path taken by any transaction identifiers associated with response transfers, for example read data transfers in the case of a read transaction, or a write response transfer in the case of a write transaction. As can be seen from FIG. 2, when a transaction identifier is received from a master over path 200, that transaction identifier is routed as one input to a multiplexer 205, which also receives as a second input a predetermined identifier, referred to in FIG. 2 as a special identifier. In addition, the transaction identifier received from the master over path 200 is routed to ID match and control logic 215 which is used to determine whether that transaction identifier matches a stored list of transaction identifiers for which aliasing is to be performed. The process performed by the ID match and control logic 215 will be described in more detail later with reference to FIG. 3. Assuming a match is detected, the ID match and control logic 215 issues a control signal to the multiplexer 205 to cause the multiplexer 205 to output over path 225 the special identifier received over path 210, and additionally the ID match and control logic 215 outputs the original transaction identifier received over path 200 to the FIFO 220.

In one embodiment, one entry will be entered into the FIFO 220 for each transaction whose transaction identifier is replaced by the special identifier. When the associated slave device issues a response transfer, the transaction identifier associated with that transfer is routed over path 230 as one input to the multiplexer 235. The other input to the multiplexer 235 is provided by the entry at the head of the FIFO 220. A transaction identifier received over path 230 is also routed to the aliased ID match logic 240 which determines whether that transaction identifier is the special identifier, and if so issues a control signal to the multiplexer 235 to cause the multiplexer to output over path 245 the transaction identifier obtained from the head of the FIFO 220. Otherwise, the aliased ID match logic 240 controls the multiplexer 235 to output over path 245 the transaction identifier received over path 230. More details of the operation of the aliased ID match logic 240 will be provided later with reference to FIG. 4.

Figure 3:
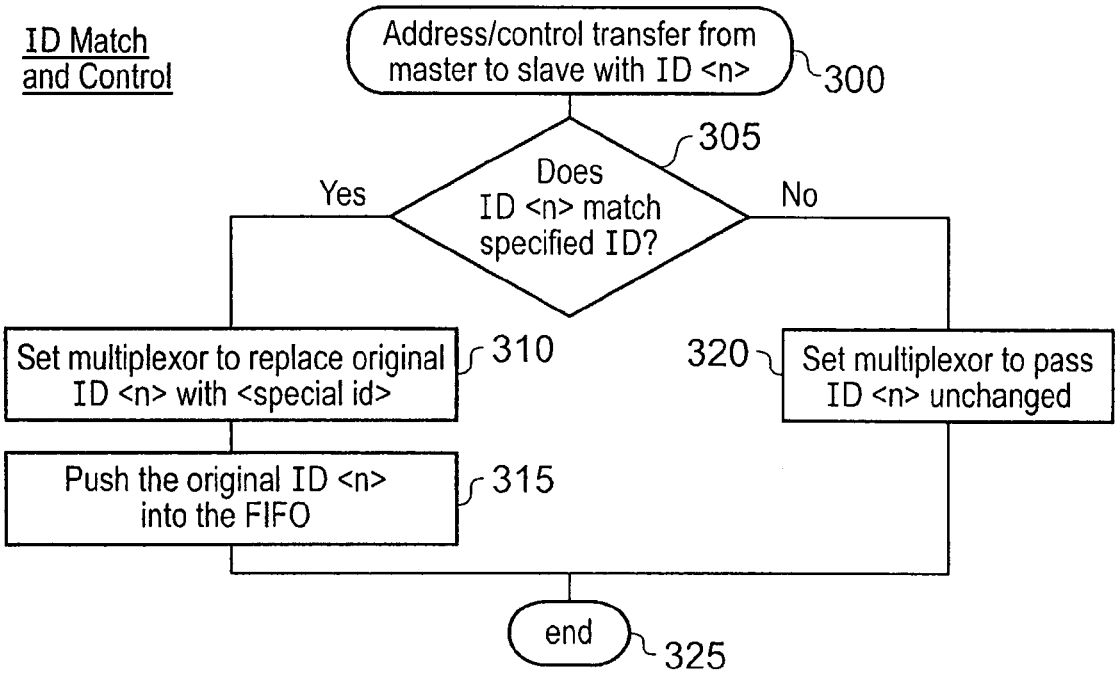
FIG. 3 is a flow diagram illustrating the operation of the ID match and control logic of FIG. 2 in accordance with one embodiment of the present invention.

FIG. 3 is a flow diagram illustrating the operation of the ID match and control logic 215 in accordance with one embodiment of the present invention. At step 300, an address and associated control information transfer is issued from a master device to a slave device with a transaction identifier of "n", where n can be any arbitrary value.

At step 305, it is determined whether the ID "n" matches one of the specified IDs in a list maintained by the ID match and control logic 215. If not, then the process proceeds to step 320, where the multiplexer 205 is set to pass the transaction ID "n" unchanged over the output path 225, whereafter the process ends at step 325.

However, if a match is detected at step 305, then the process proceeds to step 310 where the multiplexer is set to replace the original identifier "n" with the special identifier received over path 210, and in addition at step 315 the original identifier "n" is pushed into the FIFO 220. Thereafter, the process ends at step 325.

Figure 4:
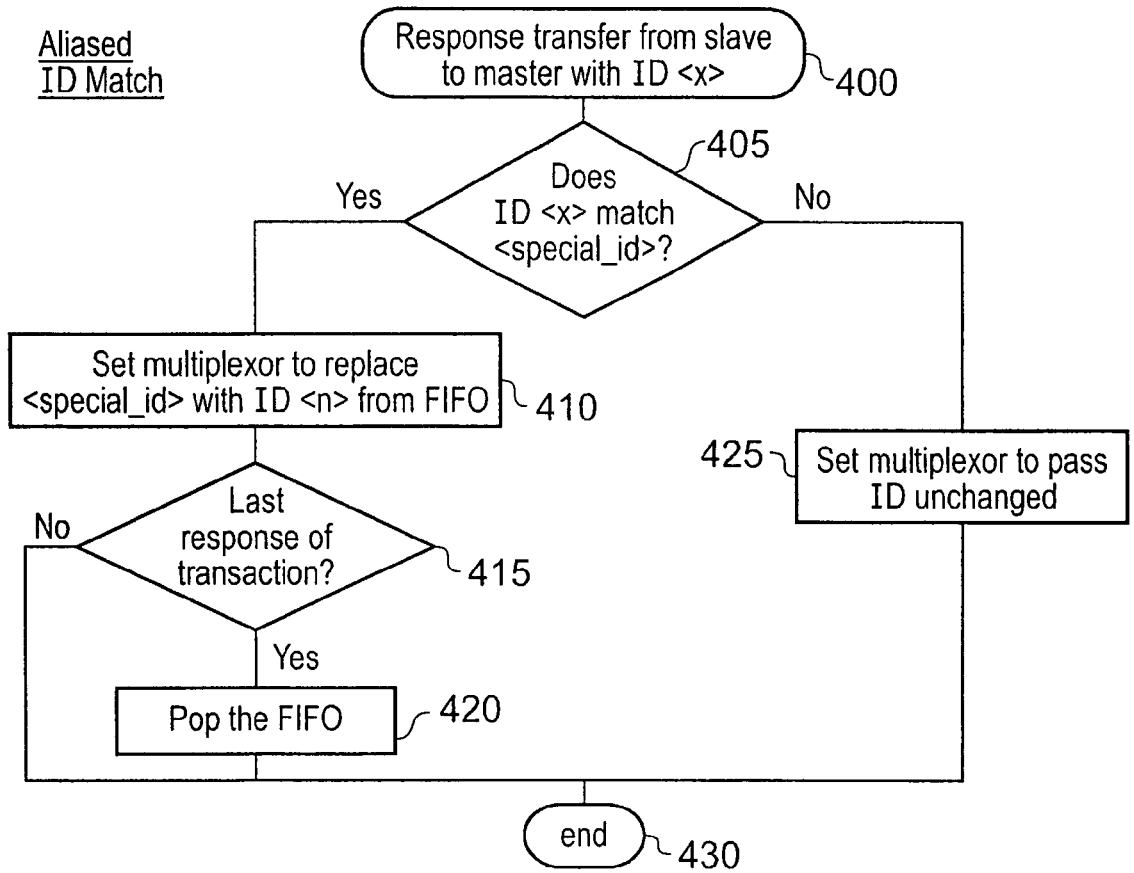
FIG. 4 is a flow diagram illustrating the operation of the aliased ID match logic of FIG. 2 in accordance with one embodiment of the present invention.

The operation of the aliased ID match logic 240 of FIG. 2 will now be described further with reference to FIG. 4. At step 400, a response transfer from a slave device to a master device is issued with an ID of "x". Thereafter, at step 405, it is determined whether the identifier "x" matches the special identifier. If not, then at step 425 the multiplexer 235 is set to pass the identifier unchanged from path 230 onto path 245, whereafter the process ends at step 430.

However, if a match is detected at step 405, then the process proceeds to step 410, where the multiplexer 235 is set to replace the special identifier with the identifier "n" obtained from the entry at the head of the FIFO 220. Thereafter, at step 415, it is determined whether the response transfer in question is the last response transfer of the transaction. If not, no further action is required and the process ends at step 430. However, if the response transfer is the last response transfer of the transaction, then the process proceeds to step 420, where the FIFO 220 is popped in order to remove the entry at the head of the FIFO and allow a new entry to proceed to the head of the FIFO.

Accordingly, in the event of a transaction which has multiple response transfers from the slave device, for example a read transaction specifying a block read process, then it will be seen that for each response transfer, the same transaction identifier will be obtained from the head of the FIFO 220 for routing over the interconnect logic 10 to the appropriate master logic unit, but when the last response transfer is encountered, this will cause the FIFO to be popped to remove that transaction identifier from the FIFO and allow the next transaction identifier to proceed to the head of the FIFO. Thereafter, when response transfers start to be issued pertaining to the next transaction that has had its ID aliased with the special ID, then the appropriate transaction identifier will be at the head of the FIFO for outputting from the multiplexer 235.

Existing protocols typically have some mechanism for marking the final response transfer of a transaction and accordingly all that is required is for the aliased ID match logic 240 to detect such a marking in association with the final response transfer, and as a result of such an identification to perform step 420. Considering the earlier-mentioned AXI protocol, write transactions only have a single response transfer, namely the write response transfer, whilst read transactions can have from 1 to 16 response transfers, namely read data transfers. The last read data transfer has an RLAST signal asserted in association with it to identify that it is the last response transfer of the read transaction.

In one embodiment, the ID match and control logic 215 is statically configured, and hence in particular the list of transaction IDs to be aliased is statically configured with an identifier or range of identifiers that are to be replaced by the special identifier. However, in alternative embodiments, the ID match and control logic 215 could be dynamically programmed. In one embodiment, the list of identifiers stored in the ID match and control logic 215 encompasses all identifiers from all masters that will be used for concurrent transactions with multiple slaves.

The following description will now illustrate an example of a sequence of transactions which could lead to a deadlock within the interconnect logic illustrated in FIG. 1 if the ID aliasing logic 55, 65, 75 were not used.

Given the interconnect shown in FIG. 1 the following is an example of a sequence of transactions that can cause deadlock:

```
M0 -> S2
M1 -> S2
M2 -> S1
M0 -> S0
M1 -> S1
M2 -> S0
M0 -> S1
M1 -> S0
M2 -> S2
```

Note:
1. M0 -> S2 should be interpreted as "Master M0 sends the control information to start a transaction to Slave S2".
2. In this example all the transactions have the same ID when they leave the master. However, the interconnect concatenates the originating master's number onto these IDs so that the slaves see different IDs depending on which master they came from. This allows the slaves to re-order transactions from different masters even if they had the same ID to start with.

After this sequence the slaves will have the following transactions queued:

```
S0: M0₂ M1₃ M2₂
S1: M0₃ M1₂ M2₁
S2: M0₁ M1₁ M2₃
```

The subscript indicates the order that the responses must be returned to the masters as required by the protocol.

If none of the slaves re-order the processing of the transactions and give their responses in the order of arrival then there will be no deadlock:

```
S0 -> M0₂ // BLOCKED because M0 is waiting for M0₁ from S2
S1 -> M0₃ // BLOCKED because M0 is waiting for M0₂ from S0
S2 -> M0₁
S0 -> M0₂
S1 -> M0₃ // BLOCKED because M0 is waiting for M0₂ from S0
S2 -> M1₁
S0 -> M1₃ // BLOCKED because M1 is waiting for M1₂ from S1
S1 -> M0₃
S2 -> M2₃ // BLOCKED because M2 is waiting for M2₁ from S1
S0 -> M1₃ // BLOCKED because M1 is waiting for M1₂ from S1
S1 -> M1₂
S2 -> M2₃ // BLOCKED because M2 is waiting for M2₁ from S1
S0 -> M1₃
S1 -> M2₁
S2 -> M2₃ // BLOCKED because M2 is waiting for M2₁ from S1
S0 -> M2₂
S1 ->
S2 -> M2₃ // BLOCKED because M2 is waiting for M2₂ from S0
S0 ->
S1 ->
S2 -> M2₃
```

However, if one of the slaves were to re-order the processing of transactions then deadlock can occur. Consider the case where Slave S0 reorders its processing so that its queue now is:

S0: M2₂M0₂M1₃

The sequence of responses would now be:

```
S0 -> M2₂ // BLOCKED because M2 is waiting for M2₁ from S1
S1 -> M0₃ // BLOCKED because M0 is waiting for M0₂ from S0
S2 -> M0₁
S0 -> M2₂ // BLOCKED because M2 is waiting for M2₁ from S1
S1 -> M0₃ // BLOCKED because M0 is waiting for M0₂ from S0
S2 -> M1₁
S0 -> M2₂ // BLOCKED because M2 is waiting for M2₁ from S1  ⎫
S1 -> M0₃ // BLOCKED because M0 is waiting for M0₂ from S0  ⎬ DEADLOCK
S2 -> M2₃ // BLOCKED because M2 is waiting for M2₁ from S1  ⎭
```

Note:
1. S0 -> M2₂ should be interpreted as "Slave S0 starts the second response expected by Master M2".

The embodiment of the invention described with reference to FIGS. 1 to 4 prevents the deadlock situation by replacing the concatenated IDs in the interconnect with a unique ID for all slaves that can reorder transactions. This prevents the re-ordering within slaves that leads to the deadlock situation.

The "single slave" and "unique ID" deadlock avoidance schemes described earlier can be mixed freely with the technique of embodiments of the invention as they explicitly avoid the need to preserve order between slaves.

However, the techniques of embodiments of the invention cannot be mixed with multi-slave deadlock avoidance schemes (e.g. the "cyclic order" scheme described earlier) as their mechanism to preserve order between slaves would interfere with the invention's mechanism.

From the above description of an embodiment of the present invention, it will be appreciated that such embodiments provide a new way to control the cyclic dependency deadlock inherent in split transaction protocol systems, and in particular the technique of embodiments of the present invention achieves this using the very rules that created the problem in the first place. In particular, the technique of embodiments of the present invention overcomes the cyclic dependency deadlock problem by use of the ordering requirement that created it. As described earlier, there are other ways of controlling the deadlock problem, but they are inevitably more complex and more restrictive as they attempt to maintain the ordering constraint with additional mechanisms.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. Interconnect logic for coupling master logic units and slave logic units within a data processing apparatus to enable transactions to be performed, each transaction comprising an address transfer from a master logic unit to a slave logic unit and one or more data transfers between that master logic unit and that slave logic unit, at least one data transfer being a response transfer from the slave logic unit to the master logic unit, each transaction having a transaction identifier associated therewith, the interconnect logic comprising:
   a plurality of connection paths operable to provide at least one address channel for carrying address transfers, and at least one data channel for carrying data transfers; and
   ID aliasing logic associated with at least a subset of said slave logic units, each slave logic unit in said at least a subset being able to issue response transfers for different transactions out of order with respect to the order of receipt by that slave logic unit of the address transfers of those transactions;
   for at least a subset of transactions, if the slave logic unit involved in that transaction is associated with the ID aliasing logic, the ID aliasing logic being operable:
   (a) to replace the transaction identifier for that transaction with a predetermined identifier and then to forward the address transfer of that transaction along with the predetermined identifier to the slave logic unit;
   (b) for any response transfer issued by the slave logic unit with the predetermined identifier, to replace the predetermined identifier with the transaction identifier removed at said step (a) to enable the routing of that response transfer over the connection paths of the interconnect logic to the master logic unit associated with that transaction.

2. Interconnect logic as claimed in claim 1, wherein if the transaction is a read transaction, the slave logic unit associated with the transaction is operable to issue one or more response transfers containing the data the subject of the read transaction.

3. Interconnect logic as claimed in claim 1, wherein if the transaction is a write transaction, the slave logic unit associated with the transaction is operable to issue a response transfer containing transaction status information at the end of a write transaction.

4. Interconnect logic as claimed in claim 1, wherein for each slave logic unit associated with the ID aliasing logic, the ID aliasing logic comprises ID matching logic for determining for each transaction involving that slave logic unit whether the associated transaction identifier matches a stored list of transaction identifiers, and if so to replace the transaction identifier with the predetermined identifier.

5. Interconnect logic as claimed in claim 1, wherein said at least a subset of transactions comprises all transactions for which the slave logic unit involved is associated with the ID aliasing logic.

6. Interconnect logic as claimed in claim 1, wherein the ID aliasing logic comprises a separate logic unit for each slave logic unit in said at least a subset of said slave logic units.

7. Interconnect logic as claimed in claim 1, wherein said at least a subset of said slave logic units comprises all of said plurality of slave logic units.

8. Interconnect logic as claimed in claim 1, further comprising:
   transaction identifier generation logic associated with each master logic unit and operable to create each transaction identifier by incorporating a master identifier with an original transaction identifier issued by the master logic unit, whereby within the interconnect logic transactions issued by different master logic units are uniquely identified.

9. Interconnect logic as claimed in claim 1, wherein at least one of said slave logic units within said at least a subset is a memory controller used to control accesses to memory.

10. Interconnect logic as claimed in claim 1, wherein said at least one address channel and said at least one data channel are unidirectional channels.

11. Interconnect logic as claimed in claim 4, wherein for each slave logic unit the ID aliasing logic further comprises:
   a FIFO storage into which any transaction identifier replaced by the predetermined identifier is placed; and
   second matching logic operable for each data transfer issued by the slave logic unit to detect whether the predetermined identifier is issued in association with that data transfer and if so to replace the predetermined identifier with the transaction identifier obtained from the FIFO storage.

12. Interconnect logic as claimed in claim 4, wherein for any transaction identifiers not in said stored list, those transactions identifiers are useable by master logic units when implementing one or more further deadlock avoidance schemes not utilising the ID aliasing logic.

13. Interconnect logic as claimed in claim 5, wherein for each slave logic unit the ID aliasing logic further comprises:
   a FIFO storage into which each transaction identifier replaced by the predetermined identifier is placed; and
   logic operable for each data transfer issued by the slave logic unit to replace the predetermined identifier with the transaction identifier obtained from the FIFO storage.

14. Interconnect logic as claimed in claim 11, wherein for each slave logic unit the ID aliasing logic is operable for each transaction involving that slave logic unit to detect a final response transfer issued by that slave logic unit for that transaction, and upon such detection to pop from the FIFO storage the transaction identifier at a head of the FIFO storage.

15. Interconnect logic as claimed in claim 13, wherein for each slave logic unit the ID aliasing logic is operable for each transaction involving that slave logic unit to detect a final response transfer issued by that slave logic unit for that transaction and upon such detection to pop from the FIFO storage the transaction identifier at a head of the FIFO storage.

16. A data processing apparatus comprising:
   a plurality of master logic units and slave logic units; and interconnect logic as claimed in claim 1 for coupling the master logic units and the slave logic units to enable transactions to be performed.

17. Interconnect logic for coupling master logic means and slave logic means within a data processing apparatus to enable transactions to be performed, each transaction comprising an address transfer from a master logic means to a slave logic means and one or more data transfers between that master logic means and that slave logic means, at least one data transfer being a response transfer from the slave logic means to the master logic means, each transaction having a transaction identifier associated therewith, the interconnect logic comprising:

a plurality of connection path means for providing at least one address channel means for carrying address transfers, and at least one data channel means for carrying data transfers; and ID aliasing means associated with at least a subset of said slave logic means, each slave logic means in said at least a subset being able to issue response transfers for different transactions out of order with respect to the order of receipt by that slave logic means of the address transfers of those transactions;

for at least a subset of transactions, if the slave logic means involved in that transaction is associated with the ID aliasing means, the ID aliasing means being used:

(a) for replacing the transaction identifier for that transaction with a predetermined identifier and then for forwarding the address transfer of that transaction along with the predetermined identifier to the slave logic means;

(b) for replacing, for any response transfer issued by the slave logic means with the predetermined identifier, the predetermined identifier with the transaction identifier removed at said step (a) to enable the routing of that response transfer over the connection path means of the interconnect logic to the master logic means associated with that transaction.

18. A method of coupling master logic units and slave logic units within a data processing apparatus to enable transactions to be performed, each transaction comprising an address transfer from a master logic unit to a slave logic unit and one or more data transfers between that master logic unit and that slave logic unit, at least one data transfer being a response transfer from the slave logic unit to the master logic unit, each transaction having a transaction identifier associated therewith, the method comprising the steps of:

employing a plurality of connection paths to provide at least one address channel for carrying address transfers, and at least one data channel for carrying data transfers;

for at least a subset of transactions involving a slave logic unit that is able to issue response transfers for different transactions out of order with respect to the order of receipt by that slave logic unit of the address transfers of those transactions:

(a) replacing the transaction identifier for each such transaction with a predetermined identifier and then forwarding the address transfer of that transaction along with the predetermined identifier to the slave logic unit; and (b) for any response transfer issued by the slave logic unit with the predetermined identifier, replacing the predetermined identifier with the transaction identifier removed at said step (a) to enable the routing of that response transfer over the connection paths to the master logic unit associated with that transaction.

* * * * *